United States Patent
Kono et al.

(10) Patent No.: US 6,635,710 B2
(45) Date of Patent: *Oct. 21, 2003

(54) MANUFACTURING METHOD FOR POLYCARBONATE

(75) Inventors: Kiyoshi Kono, Ichihara (JP); Kazutoyo Uno, Chiba (JP); Satoru Minami, Ichihara (JP); Tomoaki Shimoda, Ichihara (JP)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 316 days.

This patent is subject to a terminal disclaimer.

(21) Appl. No.: 09/208,356

(22) Filed: Dec. 10, 1998

(65) Prior Publication Data

US 2002/0037838 A1 Mar. 28, 2002

(30) Foreign Application Priority Data

Dec. 26, 1997 (JP) ................................. 9-361238

(51) Int. Cl.⁷ ........................... C08L 53/00; C08G 64/00
(52) U.S. Cl. ........................... 525/88; 525/92; 528/196; 528/198; 528/199; 528/200; 502/300; 502/344; 524/107; 524/115; 526/59
(58) Field of Search .................. 528/198, 200, 528/196, 199; 524/107, 115; 502/300, 344; 526/59; 525/88, 92

(56) References Cited

U.S. PATENT DOCUMENTS 4,931,146 A    6/1990  Iimuro et al. ................. 203/92
5,717,057 A  * 2/1998  Sakashita et al. ........... 528/198
5,886,132 A  * 3/1999  Varadarajan et al. ........ 528/196

FOREIGN PATENT DOCUMENTS

| EP | 0 520 805 A | 12/1992 |
| EP | 0 719 814 A | 7/1996 |
| EP | 0719814 | * 7/1996 |
| EP | 0 849 306 A | 6/1998 |
| GB | 1 110 736 A | 4/1968 |
| JP | 63132850 | 6/1988 |
| JP | 4020523 | 1/1992 |
| JP | 2028126 | 1/1999 |

OTHER PUBLICATIONS

S.N. Hersch et al., *Melt Transesterification of Diphenyl Carbonate with Bisphenol A in a Batch Reactor:* Journal of Applied Polymer Science, vol. 41, 1990, pp. 1033–1046, XP002103924, p. 1033–1038.

European Search Report on European Patent Application No. 98 31 0179.

* cited by examiner

*Primary Examiner*—Brenda Brumback
*Assistant Examiner*—Anish Gupta

(57) ABSTRACT

A method for manufacturing polycarbonate by melt-polycondensing bisphenol and carbonic acid diester uses as catalyst an alkali metal compound and/or alkaline earth metal compound (a). The catalyst is added to the bisphenol prior to the melt polycondensation, in an effective amount, i.e., the amount of alkali metal compound and/or alkaline earth metal compound (a) that acts effectively as a catalyst, is contained in said bisphenol, and is controlled to have the same catalytic activity as $1 \times 10^{-8}$ to $1 \times 10^{-6}$ mole of bisphenol disodium salt per mole of pure bisphenol A. The method conducts the reaction efficiently from the initial stage in a stable manner to obtain polycarbonate with good color, good heat stability and color stability during molding and the like.

5 Claims, 1 Drawing Sheet

MANUFACTURING METHOD FOR POLYCARBONATE

Figure 1:
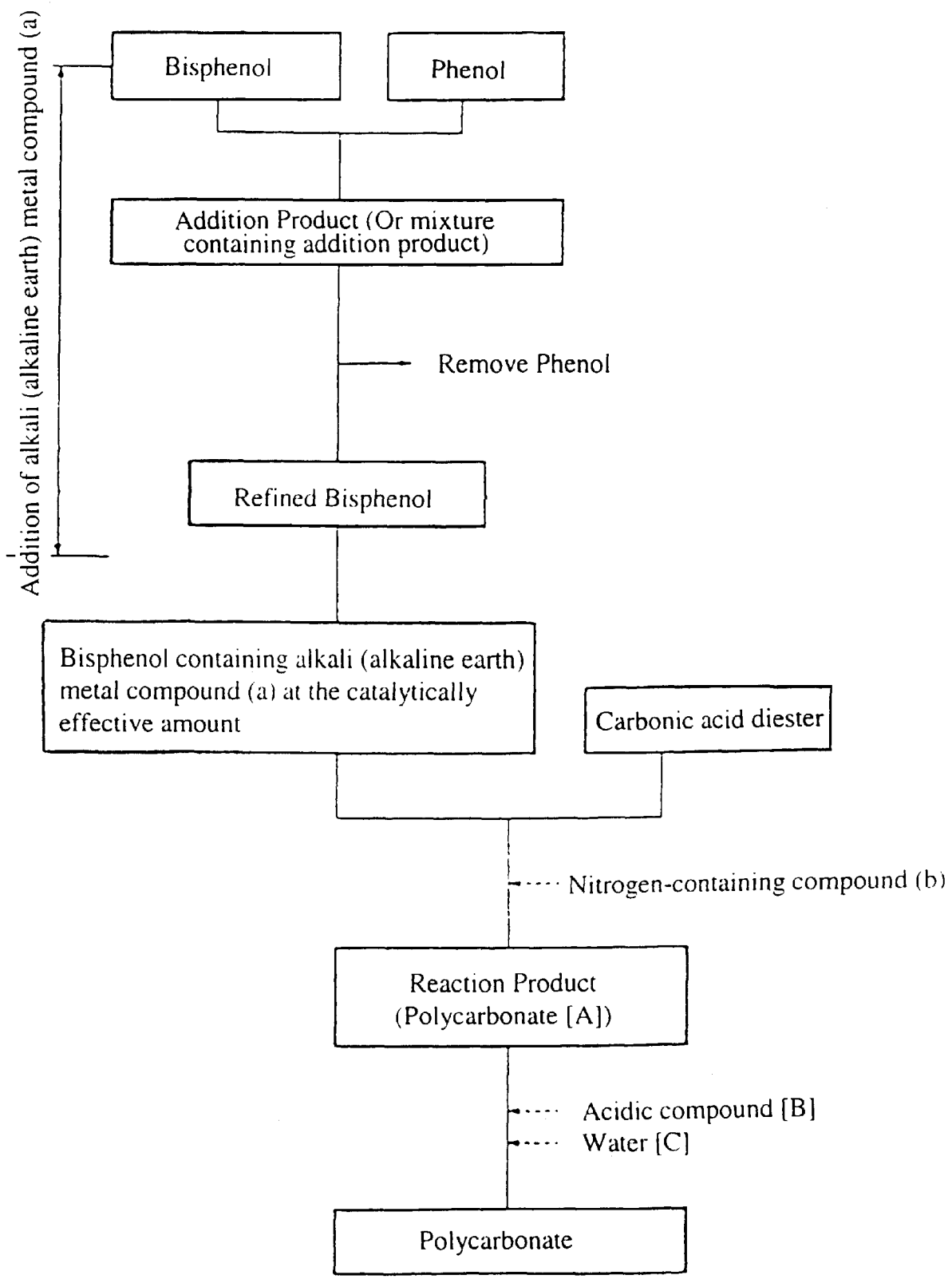

The present invention relates to methods for manufacturing polycarbonate. More specifically, it relates to methods for efficiently manufacturing polycarbonate with good color, good residence stability during molding, for example, heat stability and color stability, good transparency, and good water resistance.

Polycarbonate is widely used in various mechanical parts, optical disks, automobile parts, and other applications because of its good mechanical properties, for example, good impact resistance, and its good heat resistance and transparency.

In the prior art, such polycarbonate was manufactured by methods of directly reacting bisphenols such as bisphenol A and phosgene (the interfacial process) or methods of transesterifying bisphenol and a carbonic acid diester such as diphenyl carbonate (the melt process or the solid-phase polymerization process).

The transesterification (melt) process has drawn particular attention in recent years because it has the advantage of being able to manufacture polycarbonate more inexpensively than the interfacial process and it is preferable environmentally, since it does not use toxic substances such as phosgene or methylene chloride.

In methods of manufacturing polycarbonate by such a melt process, bisphenol and carbonic acid diester are reacted in the presence of a catalyst consisting of alkali metal compounds and/or alkaline earth metal compounds, but the polycarbonate produced discolors because it is exposed to high temperatures for prolonged periods of time during the manufacturing process. Since the polycarbonate discolors readily when the above-mentioned alkali or alkaline earth metal compounds are used in large amounts, the present applicant proposed using, for example, amounts ranging from $10^{-7}$ to $10^{-6}$ mole per mole of bisphenol in the method for manufacturing polycarbonate by melt polycondensation in Japanese Examined Patent Application Kokoku No. Hei 6-92529.

In addition, the reaction materials are usually refined before being fed to the melt polycondensation, but in a reaction system with the above-described amounts of catalyst, impurities in the reaction materials showing alkalinity or acidity exert an especially large influence on the reaction rate for producing polycarbonate, on the physical properties of the polycarbonate produced, and the like, and it is therefore important to reduce or control the amounts of such impurities to levels at which they do not influence the reaction.

Of the above reaction materials, carbonic acid diesters such as diphenyl carbonate can be refined relatively easily by distillation or the like.

Bisphenols are usually manufactured by reacting phenol and ketone in the presence of an acid catalyst, for example, an inorganic acid such as hydrochloric acid or a strongly acidic ion-exchange resin, but trace amounts of acidic substances released from these inorganic acids or strongly acidic ion-exchange resins remain in the bisphenol produced. Specifically, when bisphenol is manufactured using strongly acidic ion-exchange resin as a catalyst, trace amounts of acidic substances are released from the strongly acidic ion-exchange resin catalyst. Manufacturers remove the acidic substances from bisphenol manufactured using inorganic acid catalysts, but it is difficult to remove them all.

The raw material bisphenol obtained in this manner in standard commercial plants generally contains 2 ppm or less of acidic substances (calculated from p-toluenesulfonic acid measured by acid titration), but in polycarbonate manufactured by melt processes using extremely small amounts of alkali metal compounds or alkaline earth metal compounds as catalysts, the acidic substances contained in the raw material bisphenol, even in such amounts, cause problems that cannot be ignored such as large disparities in the polymerization rate and diminishment of the physical properties of the polymer obtained.

Refining such bisphenols is not easy because they are susceptible to pyrolysis when the high-boiling-point fraction is distilled off, and thus they are generally refined by methods involving the production of, for example, bisphenol A, as an addition product with phenol.

In Japanese Unexamined Patent Application Disclosure Kokai No. Hei 8-183844, the present applicant previously proposed adding an alkali or alkaline earth metal compound catalyst to bisphenol when refining it by a method in which it is produced as an addition product in the above-described manner in the manufacture of polycarbonate by the melt process and then feeding the bisphenol containing this alkali or alkaline earth metal compound to melt polycondensation reaction. Specifically, the applicant proposed (1) forming an addition product of crude bisphenol and phenol, (2) adding to the resultant addition product alkali or alkaline earth metal compounds as catalyst in amounts of $5 \times 10^{-8}$ to $2 \times 10^{-6}$ mole per mole of bisphenol and dispersing or dissolving them, (3) removing the phenol from the addition product, and (4) using the bisphenol obtained to manufacture polycarbonate. Such a method makes it possible to feed refined bisphenol to the reaction and, because the bisphenol contains catalyst, to carry out the melt polycondensation reaction efficiently from the initial stage.

It should be noted that in the above-cited disclosure, a specific amount of alkali metal compound or alkaline earth metal compound within the above-described range was added per mole of bisphenol. However, it was discovered that adding a specific amount of alkali (alkaline earth) metal compound to crude bisphenols caused disparities in the production rate for the polycarbonate, in its hue, and the like. Then, as a result of extensive research aimed at solving such problems, it was discovered that such undesirable effects were due to variation in the amount of acidic substances contained in the raw material bisphenol, leading to the present invention.

The present invention was pursued in response to the situation described hereinabove. Its object is to provide a method for manufacturing polycarbonate by which it is possible to stably melt-polycondense bisphenol and carbonic acid diester in the presence of a effective amount of catalyst that lies within a certain range of amounts, carry out the reaction efficiently from its initial stage, and obtain polycarbonate with good hue, good heat stability and hue stability during molding, and good water resistance.

FIG. 1 is a process flow chart for the manufacturing method for polycarbonate of the invention.

The manufacturing method for polycarbonate of the invention is characterized by the fact that in a method for manufacturing polycarbonate by melt polycondensation of bisphenol and carbonic acid diester in which an alkali metal compound and/or alkaline earth metal compound (a) added to the bisphenol before the melt polycondensation is used as the catalyst, the amount of said alkali metal compound and/or alkaline earth metal compound (a) added to the bisphenol is controlled in such a way that the effective amount of catalyst, i.e., the amount of said alkali metal compound and/or alkaline earth metal compound (a) contained in the bisphenol which acts effectively as a catalyst, has the same catalytic activity as from about $1\times10^{-8}$ to about $10^{-6}$ mole of bisphenol A disodium salt per mole of pure bisphenol A, and the bisphenol obtained is continuously fed to the melt polycondensation reaction.

Said effective amount of catalyst, as said disodium salt of bisphenol A, can be controlled to within about 10 percent of a designated value selected from a range of from about $1\times10^{-8}$ to about $1\times10^{-6}$ mole.

The effective amount of catalyst in the bisphenol such as that mentioned hereinabove can be calculated from the degree of transesterification reactivity when said bisphenol and carbonic acid diester are transesterified using an alkali metal compound and/or alkaline earth metal compound (a) contained in said bisphenol as the transesterification catalyst.

The amount of alkali metal compound and/or alkaline earth metal compound (a) to be added to said bisphenol can be controlled on the basis of the effective amount of catalyst in the bisphenol calculated from said transesterification reactivity.

In a preferred mode of the invention, in the course of forming an addition product from {1} bisphenol obtained by reacting phenol and ketone and {2} phenol or forming a mixture of said addition product and phenol, removing the phenol from the addition product or mixture, and feeding the refined bisphenol obtained to the above-mentioned melt polycondensation reaction, bisphenol containing alkali metal compound and/or alkaline earth metal compound (a) in said catalytically effective amount is prepared by adding an alkali metal compound and/or alkaline earth metal compound (a) to said addition product, said mixture of addition product and phenol, or refined bisphenol, and then the refined bisphenol containing the alkali metal compound and/or alkaline earth metal compound in the above-described catalytically effective amount is fed to the above-mentioned melt polycondensation reaction.

In the present invention, the purity of the bisphenol fed to the melt polycondensation reaction is at least about 99 percent by weight when measured by high-performance liquid chromatography.

Preferred among the bisphenols described hereinabove is bisphenol A.

In the manufacturing method for polycarbonate of the invention, while polycarbonate [A] obtained by a melt polycondensation reaction such as that described hereinabove is in the molten state, a sulfur-containing acidic compound [B] with a pKa value of about 3 or less and/or a derivative formed from said acidic compound is added in molar amounts of from about 1 to about 20 times the amount of alkali metal compound and/or alkaline earth metal compound (a) catalyst, and, as desired, water [C] is added in amounts of 5–1000 ppm, based on the polycarbonate, and the resultant mixture is kneaded.

The manufacturing method for polycarbonate of the invention features the fact that in a method for manufacturing polycarbonate by melt polycondensation of bisphenol and carbonic acid diester in which an alkali metal compound and/or alkaline earth metal compound (a) (also sometimes referred to as alkali (alkaline earth) metal compound (a) hereinbelow) added to the bisphenol before the melt polycondensation is used as the catalyst, the amount of said alkali (alkaline earth) metal compound (a) added to the bisphenol is controlled in such a way that the effective amount of catalyst, i.e., the amount of said alkali (alkaline earth) metal compound (a) contained in the bisphenol which acts effectively as a catalyst, has the same catalytic activity as from about $1\times10^{-8}$ to about $1\times10^{-6}$ mole of bisphenol A disodium salt per mole of pure bisphenol A, and the bisphenol obtained is continuously fed to the melt polycondensation reaction.

When bisphenols and carbonic acid diester are melt-polycondensed in the present invention, an alkali (alkaline earth) metal compound (a) is added to the bisphenol before it is fed to the melt-polycondensation step, and bisphenol containing an alkali (alkaline earth) metal compound (a) in a catalytically effective amount is fed to the melt polycondensation step. Thus, the manufacturing process for bisphenol containing such an alkali (alkaline earth) metal compound is described first.

Manufacture of Bisphenols

There are no particular restrictions on the bisphenol fed to the melt polycondensation reaction of bisphenol and carbonic acid diester in the present invention, an example of which is shown in the formula hereinbelow.

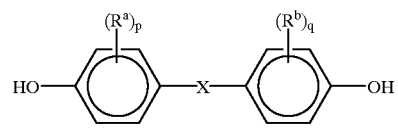

where $R^a$ and $R^b$, which may be the same or different, are halogen atoms or monovalent hydrocarbon groups. p and q are integers ranging from 0 to 4, X is

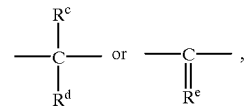

$R^c$ and $R^d$ are hydrogen atoms or monovalent hydrocarbon groups, $R^c$ and $R^d$ may form a cyclic structure, and $R^e$ is a bivalent hydrocarbon group.

Specific examples of bisphenols described by the above formula include bis(hydroxyaryl)alkanes such as
 1,1-bis(4-hydroxyphenyl)methane,
 1,1-bis(4-hydroxyphenyl)ethane,
 2,2-bis(4-hydroxyphenyl)propane (bisphenol A),
 2,2-bis(4-hydroxyphenyl)butane,
 2,2-bis(4-hydroxyphenyl)octane,
 1,1-bis(4-hydroxyphenyl)propane
 1,1-bis(4-hydroxyphenyl)-n-butane,
 bis(4-hydroxyphenyl)phenylmethane
 2,2-bis(4-hydroxy-1-methylphenyl)propane,
 1,1-bis(4-hydroxy-t-butylphenyl)propane, and
 2,2-bis(4-hydroxy-3-bromophenyl)propane,
 and bis(hydroxyaryl)cycloalkanes such as
 1,1-bis(4-hydroxyphenyl)cyclopentane and
 1,1-bis(4-hydroxyphenyl)cyclohexane.

Examples of bisphenols used in the present invention also include those in which X in the formula shown hereinabove is —O—, —S—, —SO—, or —SO$_2$—, for example,
 bis(hydroxyaryl) ethers such as 4,4'-dihydroxydiphenyl ether, and 4,4'-dihydroxy-3,3'-dimethylphenyl ether,
 bis(hydroxydiaryl) sulfides such as 4,4'-dihydroxydiphenyl sulfide, and 4,4'-dihydroxy-3,3'- dimethyldiphenyl sulfide, bis(hydroxydiaryl) sulfoxides such as 4,4'-dihydroxydiphenyl sulfoxide and 4,4'-dihydroxy-3,3'-dimethyldiphenyl sulfoxide, and bis(hydroxydiaryl) sulfones such as 4,4'-dihydroxydiphenyl sulfone and 4,4'-dihydroxy-3,3'-dimethyldiphenyl sulfone.

Compounds described by the formula hereinbelow are also examples of bisphenols.

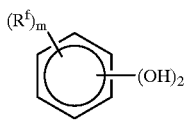

(where $R^f$ is a halogen atom, hydrocarbon group with one-to-ten carbon atoms, or a halogen-substituted hydrocarbon group, and m is an integer ranging from 0 to 4. When m is equal to or greater than 2, $R^f$ may be the same or different.)

Specific examples of the bisphenols described by the formula above include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol, catechol, and hydroquinone and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroqinone, 2,3,5,6-tetra-t-butylhydroquinone, 2,3,5,6-tetrafluorohydroquinone, and 2,3,5,6-tetrabromohydroquinone.

2,2,2',2'-Tetrahydro-3,3,3',3'-tetramethyl-1,1'-spirobi-[IH-indene]-6,6'-diol described by the following formula may also be used as a bisphenol.

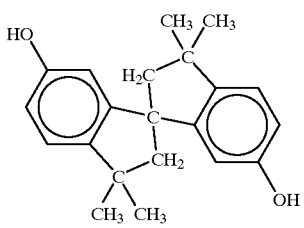

The bisphenols described by the first formula hereinabove are preferred among these examples, with bisphenol A being especially preferred.

The bisphenols described hereinabove can be obtained by conventionally known reactions for forming bisphenols by condensing phenol and ketone in the presence of an acid catalyst. Examples of the phenols used are those with a structure such that they are not linked by X in the first formula hereinabove. Bisphenols obtained by condensing phenols and formaldehyde, sulfonic acid, or the like in a manner that will produce bisphenols such as those described hereinabove may also be used.

In the present invention, a catalytically effective amount of alkali (alkaline earth) metal compound (a) is added to the bisphenol produced by reacting phenol and ketone. In a preferred mode of the invention, the following is achieved by steps (1) to (7), and, as desired, step (8): bisphenols described by the first formula hereinabove are produced from phenol and ketone; an addition product is formed from the bisphenol obtained and phenol or a mixture of the addition product and phenol is formed; the phenol is removed from the addition product or mixture; and when the refined bisphenol is to be fed to the melt polycondensation reaction, an alkali (alkaline earth) metal compound (a), the catalyst for the melt polycondensation, is added to the addition product, mixture of addition product and phenol, or refined bisphenol so that it is present at a specific catalytically effective amount.

An example of a specific preferred mode of the invention in which bisphenol A (sometimes referred to as BPA hereinbelow) is manufactured by a dehydration-condensation reaction of phenol and acetone is described hereinbelow with reference to the process flow chart shown in FIG. 1.

Step (1)

In the first step of the present invention, bisphenols such as those described by the first formula hereinabove are produced by reacting phenol and ketone.

In this reaction, excess phenol is usually used with respect to the acetone, and the preferred molar ratio of phenol and acetone (phenol/acetone) usually ranges from about 3 to about 30, with about 5 to about 20 being especially preferred.

As for the acid catalyst, any acidic ion-exchange resin catalyst known in the art may be used without any particular restrictions. A gel-type sulfonic acid cation-exchange resin with a degree of cross-linking of from abou 1 to about 8 percent, preferably from about 2 to about 6 percent, is usually preferred.

An inorganic acid catalyst such as hydrochloric acid or sulfuric acid may also be used.

The reaction is usually carried out at a temperature of from about 30 to about 100° C., preferably from about 50 to about 90° C. and at ordinary pressure to about 5 kg/cm²G.

The above-described reaction of phenol and acetone usually yields a reaction mixture containing unreacted phenol, unreacted acetone, water by-product, and by-products such as colored substances, in addition to the bisphenol A produced.

Step (2)

The catalyst and low-boiling-point substances are removed from the reaction mixture containing bisphenol obtained hereinabove.

When an inorganic acid is used as the reaction catalyst mentioned hereinabove, a process for removing the catalyst such as rinsing with water is carried out prior to distilling off the low-boiling-point substances from the reaction mixture. If a fixed-bed reactor packed with ion-exchange resin catalyst is used for the reaction, the reaction mixture obtained will not contain catalyst and a process for removing the catalyst is usually not carried out.

The reaction mixture is usually distilled under conditions of from abou 50 to about 300 mmHg and from about 70 to about 130° C. A portion of the phenol may also be removed azeotropically, together with low-boiling-point substances such as acetone and water, in the vacuum distillation.

Step (3)

A uniform solution of bisphenol in which the concentration is adjusted is obtained by adding or removing phenol.

Phenol is the preferred phenol for use. For example, it is preferred to produce an addition product of bisphenol A and phenol.

To efficiently crystallize the addition product of bisphenol A and phenol, a uniform solution of bisphenol A and phenol is formed, with a bisphenol A content of from about 20 to about 50 percent by weight being preferred and from about 30 to about 45 percent by weight being especially preferred. This uniform solution may consist of the addition product mentioned above or a mixture of the addition product and phenol.

Step (4)

A slurry is formed by cooling the uniform solution obtained hereinabove and crystallizing out the addition product of bisphenol and phenol.

It is preferred to cool the uniform solution of bisphenol A and phenol to from about 35 to about 60° C., and the cooling can be performed with an external heat exchanger or by removing the heat under reduced pressure.

Step (5)

The solids and liquid of the slurry obtained hereinabove are separated, yielding the addition product of bisphenol and phenol as a solid.

The solid-liquid separation of the slurry may be carried out by centrifugation, vacuum filtration, or the like. Crystals of the bisphenol-phenol addition product obtained by solid-liquid separation are separated from the mother liquor which contains reaction by-products and the like. The separated addition product (wet cake) may then be washed with phenol or the like.

Step (6)

The solid addition product obtained hereinabove is melted by heating.

The addition product crystals separated hereinabove, for example, an addition product of bisphenol A and phenol, is rendered into a melt (a liquid mixture), usually by heating at from about 100 to about 160° C.

Step (7)

The phenol is removed from the melt.

The bisphenol is recovered from the melt (liquid mixture) by removing the phenol, using by vacuum distillation or the like. Vacuum distillation at from about 10 to about 100 mmHg of pressure and a distillation temperature of from about 150 to about 190° C. is used to distill off the phenol. This is carried out at a temperature that is at least about 10° C. higher than the melting point of the bisphenol A-phenol mixture in the distillation column.

In this step (7), the phenol remaining in the bisphenol A may be removed by steam stripping or the like, using the methods described in, for example, Kokai Nos. Hei 2-28126 and Sho 63-132850.

Step (8)

Liquid (molten) refined bisphenol is obtained in a manufacturing step (7) for bisphenol such as that described hereinabove. In the present invention, this bisphenol may be fed as obtained in the liquid state to the polycarbonate manufacturing process, or it may also be cooled and rendered into flakes.

The bisphenol is formed into flakes by rendering the liquid bisphenol obtained in step (7) hereinabove into droplets by a method such as spraying, dripping, or course spraying, using a spray drier or the like and then cooling and solidifying the droplets with nitrogen, air, or the like.

It is preferred to manufacture bisphenol by carrying out the above-described process continuously.

When bisphenol A is manufactured in the manner described hereinabove in the present invention, an alkali (alkaline earth) metal compound (a) is added as catalyst to the addition product, a mixture of the addition product and phenol, or the refined bisphenol. Specifically, an alkali (alkaline earth) metal compound (a) is added during at least one of the steps from step (3) to step (7), and the amount added is controlled in such a way that the alkali (alkaline earth) metal compound (a) in the bisphenol fed to the melt polycondensation reaction is present in a specific catalytically effective amount to be described hereinbelow.

More specifically, the point at which alkali (alkaline earth) metal compound (a) is added includes, for example, the uniform solution obtained in step (3) hereinabove, the slurry obtained in step (4) hereinabove, the washing for the addition product (wet cake) obtained by solid-liquid separation in step (5), the melt (liquid mixture) obtained in step (6), and the molten bisphenol obtained in step (7).

It is preferred to use organic acid salts, inorganic acid salts, oxides, hydroxides, hydrides, or alcoholates of alkali metals or alkaline earth metals as alkali (alkaline earth) metal compound (a).

Specific examples of alkali earth metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodium hydrogen phosphate, dipotassium hydrogen phosphate, dilithium hydrogen phosphate, the disodium salts, dipotassium salts, and dilithium salts of bisphenol A, and the sodium salts, potassium salts, and lithium salts of phenols.

Specific examples of alkaline earth metal compounds include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. These compounds may be used in combinations of two or more.

It is preferred to use the above-described alkali (alkaline earth) metal compounds in the form of a solution, for example, as an aqueous solution, a solution of an alcohol such as methanol or ethanol, or as a phenol solution. Bisphenol containing the alkali (alkaline earth) metal compounds described hereinabove may also be used.

In the present invention, alkali (alkaline earth) metal compound (a) is added in the bisphenol manufacturing step described hereinabove, but it is important to note that the amount of alkali metal compound and/or alkaline earth metal compound (a) added is controlled in such a way that the effective amount of catalyst, i.e., an amount of alkali (alkaline earth) metal compound (a) that acts effectively as a catalyst when the bisphenol is fed to the melt polycondensation reaction, has the same catalytic activity as from about $1\times10^{-8}$ to about $1\times10^{-6}$ mole of bisphenol A disodium salt per mole of pure bisphenol A.

The standard assumption might be that the catalytically effective amount of alkali (alkaline earth) metal compound added to bisphenol here can be quantitatively determined directly by titration; however, it would be extremely difficult to measure an effective amount of catalyst equivalent to such an extremely small amount of sodium by titration. It is considered an accurate and ideal approach to find such an effective amount of catalyst in the bisphenol by finding the amount at which the alkali (alkaline earth) metal compound contained in said bisphenol acts effectively as an transesterification catalyst.

Specifically, it can be found as follows.

First, a calibration curve is prepared showing the relationship between the amount of catalyst (the amount that acts effectively as catalyst) and the degree of transesterification reactivity in the transesterification of bisphenol and carbonic acid diester. The amount of catalyst used here is the amount of bisphenol disodium salt per mole of pure bisphenol. What is meant by pure bisphenol is bisphenol containing substantially no acidic or basic impurities. Transesterification reactivity can be found as, for example, the amount of phenols or oligomer produced or the amount of unreacted bisphenol or unreacted carbonic acid diester. The amount of phenols, oligomers, or unreacted bisphenol or diphenyl carbonate can be measured with an analytical device such as a near infrared meter, refractometer, high-performance liquid chromatography, or the like.

By measuring the degree of transesterification reactivity when the bisphenol containing an alkali (alkaline earth) metal compound manufactured hereinabove and carbonic acid diester are transesterified under the same conditions (temperature and pressure) used to prepare the calibration curve, it is possible to find the effective amount of catalyst in the bisphenol from the above-described calibration curve as the amount of alkali (alkaline earth) metal compound in the bisphenol that acts effectively as transesterification catalyst, i.e., the amount having the same catalytic activity per mole of pure bisphenol as bisphenol disodium salt content.

Such measurements of the effective amount of catalyst may be conducted at specific intervals; however, it is preferred to install one of the above-mentioned analytical devices "on-line" on the bisphenol production line and to continuously measure the effective amount of catalyst in the bisphenol manufactured.

Thus, the effective amount of catalyst in the bisphenol fed to the melt polycondensation can be uniformly controlled by measuring the effective amount of catalyst in bisphenol ultimately obtained in the bisphenol manufacturing step and controlling the amount of alkali (alkaline earth) metal compound added in steps (3)-(7) on the basis of this measurement value.

In the present invention, the catalytically effective amount of alkali (alkaline earth) metal compound in the bisphenol fed to the melt polycondensation reaction in the manner described hereinabove is controlled in such a way that it has the same catalytic activity as from about $1 \times 10^{-8}$ to about $1 \times 10^{-6}$ mole of bisphenol disodium salt per mole of BPA, although it is preferred to control it to within about 10 percent of the specific value selected from the above-described range, more preferably to within about 6 percent.

The purity of the bisphenol fed to the melt polycondensation step is at least about 99 percent by weight, more preferably at least about 99.5 percent by weight, as measured by high-performance liquid chromatography.

As described hereinabove, bisphenol containing a specific catalytically effective amount of alkali (alkaline earth) metal compound (a) is continuously fed to the subsequent melt polycondensation step. Molten bisphenol may be fed directly to the melt polycondensation step from step (7) or bisphenol flakes may be supplied from step (8).

Two or more types of the above-described bisphenol may be fed to the melt polycondensation step.

In the present invention, it is possible to feed highly pure bisphenol with good hue to the melt polycondensation step and thereby manufacture polycarbonate with good hue.

The bisphenol contains pre-added alkali (alkaline earth) metal compound (a), the melt polycondensation catalyst. The alkali (alkaline earth) metal compound (a) used as catalyst is present in extremely small amounts in the present invention, but it is added and well dispersed prior to the melt polycondensation reaction as described hereinabove. The melt polycondensation reaction of bisphenol and carbonic acid diester can therefore be carried out in the presence of a small amount of evenly dispersed catalyst. Moreover, the catalytically effective amount of alkali (alkaline earth) metal compound is uniform, enabling a stable melt polycondensation reaction to be carried out.

Furthermore, the production of reaction by-products that cause discoloration can be controlled better from the initial stage of the polycondensation reaction of bisphenol and carbonic acid diester by using bisphenol containing an alkali (alkaline earth) metal compound (a) added beforehand as described hereinabove than by the prior art method of directly adding an alkali (alkaline earth) metal compound (a) to a mixed solution of bisphenol and carbonic acid diester, thereby enabling polycarbonate with good initial color tone to be obtained immediately after the polycondensation. In addition, since the phenol is removed from the addition product of bisphenol and phenol, the polycondensation step can be conducted in an efficient, uncomplicated manner.

Kokai No. Hei 4-20523, cited hereinabove, contained a description of the method of removing the phenol from the addition product of bisphenol and phenol or the mixture of the addition product and phenol described hereinabove and then manufacturing bisphenol.

Manufacture of Polycarbonate

In the present invention, polycarbonate is manufactured by melt-polycondensing the above-described bisphenol and carbonic acid diester in the presence of an alkali (alkaline earth) metal compound (a) contained at a specific catalytically effective amount in the bisphenol.

Specific examples of the carbonic acid diesters that can be used include diphenyl carbonate, ditolyl carbonate, bis (chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. These carbonic acid diesters may be used in combinations of two or more, and diphenyl carbonate is especially preferred for use among these carbonic acid diesters.

The carbonic acid diesters used in the present invention may contain dicarboxylic acid or dicarboxylic acid esters. Specifically, the carbonic acid diester may contain dicarboxylic acid or dicarboxylic acid esters in molar amounts of preferably no more than about 50 percent, more preferably no more than about 30 percent.

Examples of such dicarboxylic acids or dicarboxylic acid esters include aromatic dicarboxylic acids such as terephthalic acid, isophthalic acid, diphenyl terephthalate, and diphenyl isophthalate, aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, and diphenyl dodecanedioate, alicyclic dicarboxylic acids such as cyclopropanedicarboxylic acid, 1,2,-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, and 1,4-cyclohexanedicarboxylic acid, and diphenyl cyclopropanedicarboxylate, diphenyl 1,2-cyclobutanedicarboxylate, diphenyl 1,3- cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, and diphenyl 1,4-cyclohexanedicarboxylate. The carbonic acid diester may contain two or more of these dicarboxylic acids or dicarboxylic acid esters.

When polycondensing such carbonic acid diester and bisphenol in the present invention, it is usually preferred to use carbonic acid diester in amounts of from about 1.0 to about 1.30 mole per mole of bisphenol, with from about 1.01 to about 1.20 mole being more preferred.

When polycarbonate is manufactured in the present invention, polyfunctional compounds having at least three functional groups per molecule may be used together with the above-described bisphenol and carbonic acid diester. Preferred polyfunctional compounds have phenolic hydride groups or carboxyl groups, with compounds containing at least three phenolic hydroxide groups being especially preferred. Examples of such polyfunctional compounds include 1,1,1-tris(4-hydroxyphenyl)ethane, 2,2',2"-tris(4-hydroxyphenyl)diisopropylbenzene, α-methyl-α,α',α"-tris(4-hydroxphenyl)-1,4-diethylbenzene, α, α',α"-tris(4-hydroxyphenyl)-1,3,5-triisopropylbenzene, phloroglucinol, 4,6-dimethyl-2,4,6-tri(4-hydroxyphenyl)-heptane-2,1,3,5-tri(4-hydroxyphenyl)benzene, 2,2-bis-[4,4-(4,4'-dihydroxyphenyl)-cyclohexyl]-propane, trimellitic acid, 1,3,5-benzenetricarboxylic acid, and pyromellitic acid.

Preferred among these are 1,1,1-tris(4-hydroxphenyl)ethane and α,α',α"-tris(4-hydroxphenyl)-1,3,5-triisopropylbenzene.

Such polyfunctional compounds are usually used in amounts of about 0.03 moles or less, preferably from about 0.001 to about 0.02 moles, more preferably from about 0.001 to about 0.01 moles, per mole of bisphenol.

The carbonic acid diester and other polyfunctional compounds described hereinabove may be used in solid form in the manufacture of polycarbonate, or they may be fed directly from their manufacturing devices in molten form.

Furthermore, a basic compound (b) may be used in combination with alkali (alkaline earth) metal compound (a) as melt polycondensation catalyst in the present invention.

Examples of such basic compounds (b) include nitrogen-containing compounds that decompose readily or are volatile at high temperatures. Specific examples of such compounds are listed hereinbelow:

ammonium hydroxides having alkyl, aryl, or alkaryl groups such as tetramethylammonium hydroxide (Me$_4$NOH), tetraethylammonium hydroxide (Et$_4$NOH), tetrabutylammonium hydroxide (Bu$_4$NOH), and trimethylbenzylammonium hydroxide (ø-CH$_2$(Me)$_3$NOH), tertiary amines such as trimethylamine, triethylamine, dimethylbenzylamine, and triphenylamine, secondary amines described by R'$_2$NH where R' is an alkyl such as methyl or ethyl or an aryl group such as phenyl or toluyl, primary amines described by R"NH$_2$ where R" is as described hereinabove, pyridines such as 4-dimethylaminopyridine, 4-diethylaminopyridine, and 4-pyrrolidinopyridine, imidazoles such as 2-methylimidazole and 2-phenylimidazole, and basic salts such as ammonia, tetramethylammonium borohydride (Me$_4$NBH$_4$), tetrabutylammonium borohydride (Bu$_4$NBH$_4$), tetrabutylammonium tetraphenylborate (Bu$_4$NBPh$_4$), and tetramethylammonium tetraphenylborate (Me$_4$NBPh$_4$).

Preferred for use among these are tetraalkylammonium hydroxides, especially, electronics-grade tetraalkylammonium hydroxides with low levels of metallic impurities.

Nitrogen-containing basic compounds (b) such as those mentioned hereinabove may be used in amounts of from about $1 \times 10^{-6}$ to about $1 \times 10^{-1}$ mole, preferably from about $1 \times 10^{-5}$ to to about $1 \times 10^{-2}$ moles, per mole of bisphenol.

In addition, boric acid compounds (c) may also be used as catalyst.

Examples of such boric acid compounds (c) include boric acid and boric acid esters.

Examples of boric acid esters include those described by the following formula.

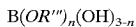

$$B(OR''')_n(OH)_{3-n}$$

where R''' is an alkyl such as methyl or ethyl or an aryl such as phenyl, and n is 1, 2, or 3.

Specific examples of such boric acid esters include trimethyl borate, triethyl borate, tributyl borate, trihexyl borate, triheptyl borate, triphenyl borate, tritolyl borate, and trinaphthyl borate.

Such boric acid or boric acid esters (c) may be used in amounts of from about $1 \times 10^{-8}$ to about $1 \times 10^{-1}$ mole, preferably from about $1 \times 10^{-7}$ to about $1 \times 10^{-2}$ mole, more preferably from about $1 \times 10^{-6}$ to to about $1 \times 10^{-4}$ mole, per mole of bisphenol.

In the present invention, it is preferred to use as melt polycondensation catalyst, for example, a combination of alkali (alkaline earth) metal compound (a) and nitrogen-containing basic compound (b), and it is more preferred to use a combination of the three, alkali (alkaline earth) metal compound (a), nitrogen-containing basic compound (b), and boric acid or boric acid ester (c).

This nitrogen-containing basic compound (b) and boric acid or boric acid ester (c) may be added to the melt polycondensation reaction system (the mixed bisphenol and carbonic acid diester solution).

It is preferred to use the above-mentioned amounts of alkali (alkaline earth) metal compound (a) and nitrogen-containing basic compound (b) in combination as catalyst because the polycondensation can be carried out at an adequate speed and high-molecular-weight polycarbonate can be produced at high levels of polymerization activity.

The polycondensation of bisphenol and carbonic acid diester in the presence of such a catalyst can be conducted under the same conditions as polycondensation reactions known in the prior art.

Specifically, in the first step of the reaction, bisphenol and carbonic acid diester are reacted at a temperature of from about 80 to about 250° C., preferably from about 100 to about 230° C., more preferably from about 120 to about 190° C., for from about 0 to about 5 h, preferably from about 0 to about 4 h, still more preferably from about 0 to about 3 h, at ordinary pressure. Then the reaction temperature is raised, and the reaction of bisphenol and carbonic acid diester is carried out as the pressure of the reaction system is reduced. Finally, the polycondensation reaction of the bisphenol and carbonic acid diester is carried out at a reduced pressure of about 5 mmHg or less, preferably about 1 mmHg or less and a temperature of from about 240 to about 320° C.

The type of polycondensation reaction described hereinabove may be conducted as a continuous process or a batch process. The reactor used for the reaction may be a tank-type, tubular-type, or column-type reactor.

The polycarbonate reaction product obtained in the manner described herein above usually has an intrinsic viscosity, as measured in methylene chloride at 20° C., of from about 0.1 to about 1.0 dL/g, preferably from about 3.0 to about 0.65 dL/g.

The preferred melt flow rate of such polycarbonate measured at a temperature of 300° C. and load of 1.2 kg is from about 1 to about 70 g/10 min, more preferably from about 2 to about 50 g/10 min, for high-viscosity product and from about 5 to about 20 g/10 min, more preferably to about 8 to about 16 g/10 min, for low-viscosity product measured in the same manner.

As described hereinabove, the manufacturing method related to the invention does not use toxic substances such as phosgene or methylene chloride in the melt polycondensation, and as a result it is preferable from an environmental standpoint.

A polycarbonate reaction product (referred to as "polycarbonate [A]" hereinbelow) with good initial hue is obtained in accordance with the present invention, described hereinabove.

In the present invention, it is preferred to add a sulfur-containing acidic compound [B] with a pKa value of about 3 or less and/or derivatives formed from said acidic compounds (also referred to as acidic compound [B] hereinbelow) immediately after the polycondensation reaction without cooling the polycarbonate [A] reaction product obtained in the manner described hereinabove. Examples are cited hereinbelow.

It is more preferred to add a specified amount of water [C] together with acidic compound [B].

Examples of the sulfur-containing acidic compounds [B] and derivatives of such compounds used in the present invention include sulfurous acid, sulfuric acid, sulfinic acid-based compounds, and sulfonic acid-based compounds, and derivatives thereof.

Specifically:
examples of sulfurous acid derivatives include dimethyl sulfite, diethyl sulfite, dipropyl sulfite, dibutyl sulfite, and diphenyl sulfite,
examples of sulfuric acid derivatives include dimethyl sulfate, diethyl sulfate, dipropyl sulfate, dibutyl sulfate, and diphenyl sulfate,
examples of sulfinic acid-based compounds include benzenesulfinic acid, toluenesulfinic acid, and naphthalenesulfinic acid.

Examples of sulfonic acid-based compounds and derivatives of them are compounds described by the general formula hereinbelow or ammonium salts of them.

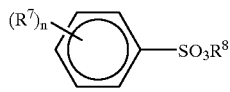

where $R^7$ is a hydrocarbon group with one-to-fifty carbon atoms or a halogen-substituted hydrocarbon group, $R^8$ is a hydrogen atom, hydrocarbon group with one-to-fifty carbon atoms, or halogen-substituted hydrocarbon group, and n is an integer ranging from 0 to 3.

Examples of such sulfonic acid-based compounds and derivatives thereof include
sulfonic acids such as benzenesulfonic acid and p-toluenesulfonic acid,
sulfonic acid esters such as methyl benzenesulfonate, ethyl benzenesulfonate, butyl benzenesulfonate, octyl benzenesulfonate, and phenyl benzenesulfonate, and
methyl p-toluenesulfonate, ethyl p-toluenesulfonate, butyl p-toluenesulfonate, octyl p-toluenesulfonate, and phenyl p-toluenesulfonate,
and sulfonic acid ammonium salts such as ammoniump-toluenesulfonate.

In addition, sulfonic acid-based compounds such as trifluoromethanesulfonic acid, napthalenesulfonic acid, sulfonated polystyrene, and methyl acrylate-sulfonated styrene copolymer may also be used.

These substances may be used in combinations of two or more.

In the present invention, it is preferred to use sulfonic acid-based compounds described by the general formula hereinabove or derivatives thereof as acidic compound [B].

It is especially preferred to use ester compounds described in the general formula hereinabove wherein $R^7$ is a substituted aliphatic hydrocarbon group with one-to-six carbon atoms, $R^8$ is a substituted aliphatic hydrocarbon group with one-to-eight carbon atoms, and n is an integer ranging from 0 to 3. Specifically, it is preferred to use ethyl benzenesulfonate, butyl benzenesulfonate, methyl p-toluenesulfonate, ethyl p-toluenesulfonate, and butyl p-toluenesulfonate.

Among these, it is especially preferred to use methyl p-toluenesulfonate, ethyl p-toluenesulfonate, and butyl p-toluenesulfonate.

These substances may be used in combinations of two or more.

In the present invention, it is preferred that polycarbonate [A] contain an acidic compound [B] such as those described hereinabove in molar amounts of from about 1 to about 20 times, preferably from about 1 to about 10 times, more preferably from about 1 to about 8 times the amount of alkali (alkaline earth) metal compound (a) used in the above-described reaction for polycarbonate [A].

The residual alkali metal compound in reaction product (polycarbonate) [A] can be neutralized or weakened and polycarbonate with even more improved residence stability and water resistance can ultimately be obtained by adding an acidic compound [B] to polycarbonate [A] in the amounts described above.

It is also preferred in the present invention to add water [C] together with the acid compound [B] described hereinabove. It is preferred to add water in amounts from about 5 to about 1000 ppm, more preferably from about 10 to about 500 ppm, especially preferably from about 20 to about 300 ppm, based on polycarbonate [A].

When water [C] is added together with acidic compound [B] in this manner, water [C] and acidic compound [B] cause an increase in the neutralizing efficiency of the basic catalyst in polycarbonate [A], enabling polycarbonate with good residence stability when molten as well as good hue, transparency, water resistance, and weather resistance to be obtained.

When more than about 1000 ppm of water is added, the polycarbonate is susceptible to hydrolysis, and the physical properties of the polycarbonate may be diminished.

In the present invention, it is preferred to obtain polycarbonate by adding the above-described acidic compound [B] and a small amount of water [C] to the polycarbonate [A] reaction product and then kneading.

Any conventional kneader such as a single-screw extruder, a twin-screw extruder, or a static mixer may be used to knead polycarbonate [A], acidic compound [B], and water [C]. These kneaders are effective for this purpose whether they are vented or not vented.

Specifically, it is preferred to add acidic compound [B] and water [C] while polycarbonate [A] obtained from the polycondensation reaction is in the molten state in the reactor or in the extruder. This acidic compound [B] and water [C] may be added separately, or they may be added simultaneously. There are no restrictions on the sequence in which they are added, but it is preferred to add them simultaneously.

More specifically, to manufacture polycarbonate from polycarbonate [A], acidic compound [B], and water [C], for example, polycarbonate may be formed by adding acidic compound [B] and water [C] to polycarbonate [A] obtained from the polycondensation reaction while it is still in the reactor and then running the mixture through an extruder to be pelletized. Alternatively, polycarbonate may be formed after polycarbonate [A] obtained in the polycondensation reaction has left the reactor by adding acidic substance [B] and water [C] while polycarbonate [A] is being pelletized in the extruder and kneading the three together.

Usually, when polycarbonate is used, e.g., for molding, the polycarbonate pellets are remelted and various additives such as heat stabilizers are blended into the melt. When polycarbonate pellets obtained in accordance with the present invention are melted for blending additives or for molding, the polycarbonate is especially resistant to pyrolysis due to melting and it is resistant to reductions in molecular weight and to discoloration because it has improved thermal stability and, when molten, good residence stability.

Furthermore, in the present invention, additives [D] may be added to polycarbonate [A] along with acidic compound [B] and water [C] in amounts that do not detract from the object of the invention.

Such additives [D] may be added to polycarbonate [A] simultaneous with acidic compound [B] and water [C] while the polycarbonate is in the molten state, or they may be added separately. In the present invention, it is preferred to add those among the below-mentioned additives [D] that are reactive after adding acidic compound [B] and water [C].

A wide variety of additives that are generally added to polycarbonate, as appropriate for the intended use of the polycarbonate, can be cited as specific examples of the additives [D] used in the present invention, for example, heat stabilizers, epoxy compounds, uv absorbers, mold-parting agents, colorants, anti-static agents, slipping agents, antiblocking agents, lubricants, anticlouding agents, natural oils, synthetic oils, waxes, organic fillers, and inorganic fillers.

Of these, it is preferred to use heat stabilizers, epoxy compounds, uv absorbers, mold-parting agents, colorants, and the like such as those described hereinbelow. These additives may be used in combinations of two or more.

Specific examples of heat stabilizers used in the present invention include phosphorus compounds, phenol-based stabilizers, organic thioether-based stabilizers, and hindered amine-based stabilizers.

Examples of phosphorus compounds include phosphoric acid, phosphorous acid, hypophosphorous acid, pyrophosphoric acid, polyphosphoric acid, phosphoric acid esters, and phosphorous acid esters.

Examples of such phosphoric acid esters include
trialkyl phosphates such as trimethyl phosphate, triethyl phosphate, tributyl phosphate, trioctyl phosphate, tridecyl phosphate, trioctadecyl phosphate, distearylpentaerythrityl diphosphate, tris(2-chloroethyl) phosphate, and tris(2,3-dichloropropyl) phosphate,
tricycloalkyl phosphates such as tricyclohexyl phosphate, and
triaryl phosphates such as triphenyl phosphate, tricresyl phosphate, tris(nonylphenyl) phosphate, and 2-ethylphenyldiphenyl phosphate.

An example of phosphorous acid esters would be compounds described by the following formula.

where R denotes an alicyclic hydrocarbon group, aliphatic hydrocarbon group, or aromatic hydrocarbon group that may be the same or different.

Examples of compounds described by such a formula include
trialkyl phosphites such as trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, and tris(2,3-dicloropropyl) phosphite,
tricycloalkyl phosphites such as tricyclohexyl phosphite,
triaryl phosphites such as triphenyl phosphite, tricresyl phosphite, tris(ethylphenyl) phosphite, tris(2,4,-di-t-butylphenyl) phosphite, tris(nonylphenyl) phosphite, and tris(hydroxyphenyl) phosphite, and
aryl alkyl phosphites such as phenyldodecyl phosphite, diphenyldecyl phosphite, diphenylisooctyl phosphite, phenylisooctyl phosphite, and 2-ethylhexyldiphenyl phosphite.

Further examples of phosphorous acid esters include distearylpentaerythrityl diphosphite, and bis(2,4-di-t-butylphenyl)pentaerythrityl phosphite. These phosphite esters may be used in combinations of two or more.

Among these examples, phosphorous acid esters described by the formula hereinabove are preferred, aromatic phosphorous acid esters are more preferred, and tris(2,4-di-t-butylphenyl) phosphite is especially preferred.

Examples of phenol-based stabilizers include n-octadecyl-3-(4-hydroxy-3',5'-di-t-butylphenyl) propionate, tetrakis[methylene-3-(3',5'-di-t-butyl-4-hydroxyphenyl)propionate]methane, 1,1,3-tris(2-methyl-4-hydroxy-5-t-butylphenyl)butane, distearyl(4-hydroxy-3-methyl-5-t-butyl)benzyl malonate, and 4-hydroxymethyl-2,6-di-t-butylphenol.

Examples of thioether-based stabilizers include dilauryl thiodipropionate, distearyl thiodipropionate, dimyristyl-3,3'-thiodipropionate, ditridecyl-3,3'-thiodipropionate, and pentaerythritol tetrakis(â-lauryl-thiopropionate).

Examples of hindered amine-based stabilizers include bis(2,2,6,6-tetramethyl-4-piperidyl) sebacate, bis(1,2,2,6,6-pentamethyl-4-piperidyl) sebacate, 1-[2-{3-(3,5-di-t-butyl-4-hydroxyphenyl)propionyloxy} ethyl]-4-{3-(3,5-di-t-butyl-4-hydroxyphenyl)propionyloxy}-2,2,6,6-tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, 2-(3,5-di-t-butyl-4-hydroxybenzyl)-2-n-butylmalonic acid bis(1,2,2,6,6-pentamethyl-4-piperidyl) [sic 6 bis(1,2,2,6,6-pentamethyl-4-piperidyl) 2-(3,5-di-t-butyl-4-hydroxybenzyl-2-n-butylmalonate], and tetrakis(2,2,6,6-tetramethyl-4-piperidyl) 1,2,3,4-butanetetracarboxylate.

These compounds may be used in combinations of two or more.

These heat stabilizers may be used in amounts of from about 0.001 to about 5 parts by weight, preferably from about 0.005 to about 0.5 parts by weight, more preferably from about 0.01 to about 0.3 parts by weight, per 100 parts by weight of polycarbonate.

These heat stabilizers may be added in a solid or liquid state.

It is preferred to add such heat stabilizers in the same manner as [B] and [C] while polycarbonate [A] is in the molten state because polycarbonate with a less extensive thermal history can be manufactured. Additionally, the polycarbonate obtained contains heat stabilizer, which suppresses pyrolysis during remelting.

Epoxy compounds with at least one epoxy group per molecule are used.
Specifically,
expoxidized soybean oil, epoxidized linseed oil, phenylglycidyl ether, allylglycydyl ether, t-butylphenylglycydyl ether, 3,4-epoxycycloexylmethyl-3'4'-epoxycyclohexyl carboxylate, 3,4-epoxy-6-methylcyclohexylmethyl-3', 4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3, 4-epoxycyclohexyl carboxylate, 3,4-epoxy-6-methylcyclohexylmethyl-6'-methylcyclohexyl carboxylate, bisphenol A diglycydyl ether, tetrabromobisphenol A glycydyl ether, phthalic acid glycydyl ester, hexahydrophthalic acid glycydyl ester, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3, 4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, oxtadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl 4,5-epoxy-cis-1,2-cyclohexyl dicarboxylate, and di-n-butyl-3-t-butyl-4,5-epoxy-cis-1,2-cyclohexyl dicarboxylate.

These epoxy compounds may be used in combinations of two or more.

Among them, it is preferred to use alicyclic epoxy compounds, especially 3,4-epoxycyclohexylmethyl-3',4'-epoxycyclohexyl carboxylate.

Such epoxy compounds may be added to polycarbonate [A] hereinabove in amounts of 1–2000 ppm, with 10–1000 ppm being preferred.

When epoxy compounds are used as additives [D], it is especially preferred to add them after adding acidic compound [B] and water [C] in order to neutralize acidic compound [3] which is added in excess amounts. Neutralizing excess acidic compound [B] in this way yields polycarbonate with especially good water resistance and transparency is obtained.

There are no particular restrictions on uv absorbers, and any conventional uv absorbers can be used, examples including salicylic acid-based uv absorbers, benzophenone-based uv absorbers, benzotriazole uv absorbers, and cyanoacrylate uv absorbers.

Specific examples of salicylic acid-based uv absorbers include phenyl salicylate and p-t-butylphenyl salicylate.

Examples of benzophenone-based uv absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples of benzotriazole-based uv absorbers include 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4",5",6"-tetrahydrophthalimidomethyl)-5'-methylphenyl]benzotriazole, and 2,2'-methylenebis[4-*(1,1,3,3-tetramethylbutyl)-6-(2H-benzotriazol-2-yl)phenol.

Examples of cyanoacrylate-based uv absorbers include 2-ethylhexyl-2-cyano-3,3-diphenyl acrylate and ethyl-2-cyano-3,3-diphenyl acrylate. These compounds may be used in combinations of two or more.

Ultraviolet absorbers are usually used in amounts of from about 0.001 to about 5 parts by weight, preferably from about 0.005 to about 1 part by weight, more preferably from about 0.01 to about 0.5 parts by weight, per 100 parts by weight of polycarbonate [A].

Any of a wide variety of conventionally known mold-parting agents may be used without any particular restrictions.

For example, one may use
hydrocarbon mold-parting agents such as natural and synthetic paraffin waxes, polyethylene waxes, and fluorocarbons,
fatty acid-based mold-parting agents, for example, higher fatty acids such as stearic acid and hydroxystearic acid and oxyfatty acids,
fatty acid amide-based mold-parting agents, for example, fatty acid amides such as stearamide and ethylene-bis-stearamide and alkylene bis-fatty acid amides,
alcohol-based mold-parting agents, for example, aliphatic alcohols such as stearyl alcohol and cetyl alcohol, polyhydric alcohol, polyglycol, and polyglycerol,
fatty acid ester-based mold-parting agents, for example, lower alcohol esters of fatty acids such as butyl stearate and pentaerythritol tetrastearate; fatty acid polyhydric alcohol esters; and fatty acid polyglycol esters, and
silicone-based mold-parting agents such as silicone oils.
These mold-parting agents may be used in combinations of two or more.

Mold-parting agents may be used in amounts of usually from about 0.001 to about 5 parts by weight, preferably from about 0.005 to about 1 part by weight, more preferably from about 0.01 to about 0.5 parts by weight, per 100 parts by weight of polycarbonate [A].

Pigments or dyes may be used colorants. Either inorganic or organic colorants may be used, and colorants may be used in combinations.

Specific examples of inorganic colorants include oxides such as titanium dioxide and iron oxide red; hydroxides such as alumina white; sulfides such as zinc sulfide; ferrocyanides such as selenide and Prussian blue; chromates such as zinc chromate and molybdenum red; sulfates such as barium sulfate; carbonates such as calcium carbonate; silicates such as ultramarine blue; phosphates such as manganese violet; carbon such as carbon black; and metallic powder colorants such as bronze powder and aluminum powder.

Specific examples of organic colorants include nitroso colorants such as naphthol green B; nitro colorants such as naphthol yellow S; azo colorants such as lithol red, Bordeaux 10B, naphthol red, and chromophthal yellow; phthalocyanine colorants such as phthalocyanine blue and fast sky blue; and condensed polycyclic colorants such as indanthrone blue, quinacridone violet, dioxazine violet.

Colorants may be used in amounts of usually from about $1\times10^{-6}$ to about 5 parts by weight, preferably from about $1\times10^{-5}$ to about 3 parts by weight, more preferably from about $1\times10^{-5}$ to about 1 part by weight per 100 parts by weight of polycarbonate.

In the present invention, acidic compound [B], water [C], and additives [D] such as those mentioned hereinabove are added to polycarbonate [A] while it is in the molten state as was mentioned hereinabove. However, [B], [C], and [D] may be diluted with polycarbonate powder in amounts that do not detract from the object of the invention and then added to polycarbonate [A], or master pellets already containing high concentrations of [B], [C], and [D] may be added to polycarbonate [A]. At this time a certain amount of water is absorbed by the polycarbonate powder and pellets; therefore, the amount of water absorbed must be subtracted to the water to be added when adding water [C].

As described hereinabove, in accordance with the manufacturing method for polycarbonate of the invention, the polycondensation reaction of bisphenol and carbonic acid diester can be carried out in the presence of an extremely small amount of catalyst that is controlled to be within a specified range from the initial stage of the reaction. Thus, in accordance with the present invention, it is possible to efficiently manufacture polycarbonate with good hue, good thermal stability and hue stability during molding, and good transparency and water resistance.

In addition, polycarbonate in which the catalyst is stabilized and which has improved heat resistance and water resistance can be obtained by adding additives such as acidic compounds to the reaction product while it is in the molten state immediately after the melt polycondensation reaction.

Polycarbonate manufactured in accordance with this method is ideal for use as construction material in the form of sheets or the like, optical lenses such as automobile head lamp lenses and spectacle lenses, optical recording materials, and the like, not to mention as a general molding material.

EXAMPLES

The present invention is described hereinbelow by means of examples; however, the invention is not limited by these examples.

In the present specification, the following methods were used to measure the effective amount of catalyst equivalent to a bisphenol A disodium salt concentration, the hue and purity of the bisphenol A, and the MFR and hue of the polycarbonate. Effective Amount of Catalyst Equivalent to Bisphenol A Disodium Salt Concentration A total of 20 mL/h of bisphenol A (also referred to as BPA hereinbelow) produced in the working examples and diphenyl carbonate was fed to a 100-mL scale reactor at a molar ratio of 1:1, and a transesterification reaction was carried out at 160° C. for a residence time of 30 min. The phenol concentration (the amount of phenol produced by the reaction, i.e., the transesterification reactivity) in the liquid leaving the reactor was measured with a near infrared analyzer, and the effective amount of catalyst was found from a calibration curve described hereinbelow prepared beforehand under identical transesterification conditions.

Effective amount of catalyst (Moles of bisphenol A disodium salt/moles of BPA)=$3.33\times10^{-7}\times$ phenol concentration (percent by weight)

Color of the Bisphenol A (Yellowness Index: YI)

The color of bisphenol A heated at 250C for 10 min in air was measured visually, using APHA standard colorimetry fluids.

Purity of the Bisphenol A

Measured by high-performance liquid chromatography (HPLC).

Color of the Polycarbonate

Injection-molded sheets, 3 mm thick, were molded at a cylinder temperature of 290° C., injection pressure of 1000 kg/cm, cycle time of 45 sec, and mold temperature of 100° C., and the yellowness index (YI) was measured by measuring the X, Y, and Z values with a Nihon Denshoku Kogyo K.K. ND-1001 DP Color and Color Difference Meter, using the through-transmission technique.

$YI=100(1.277X-1.060Z)/Y$

MFR of the Polycarbonate

Measured at a temperature of 250° C. and load of 1.2 kg in accordance with the methods in JIS K-7210.

The basic manufacturing processes for bisphenol A and polycarbonate in the working examples are described hereinbelow.

Manufacturing Process for Bisphenol A (1) Phenol and acetone were reacted at a molar ratio of phenol/acetone equal to 5/1 at 50° C. and ordinary pressure, using a sulfonic acid-type ion-exchange resin with a degree of cross-linking of 4 percent as the acid catalyst, and a reaction mixture was obtained.

(2) The reaction mixture obtained hereinabove was vacuum-distilled at 200 mmHg and 120° C. to remove unreacted acetone, water by-product, and the like and obtain a crude liquid (bisphenol A).

(3) The bisphenol A concentration was adjusted to 30 percent by weight by distilling off phenol from the crude liquid obtained hereinabove.

(4) The crude liquid with the adjusted concentration (the uniform solution) described hereinabove was cooled to 42° C. by removing heat with an external heat exchanger, thereby crystallizing the addition product of bisphenol A and phenol and forming a slurry.

(5) The slurry was separated into the addition product (the crystal part) and the mother liquor by centrifugation and vacuum filtration.

(6) The addition product of bisphenol A and phenol that underwent solid-liquid separation was melted by heating at 130° C.

(7) The phenol was removed by vacuum-distilling the melt (liquid mixture) at 100 mmHg and 190° C., and molten bisphenol A was recovered.

(8) The molten bisphenol A obtained in step (7) hereinabove was rendered into droplets with a spray drier, cooled, and solidified with nitrogen to obtain bisphenol A flakes.

Manufacturing Process for Polycarbonate

Bisphenol A in the molten state sent from step (7) or bisphenol A rendered into flakes in step (8) (feed rate, 36.0 kg/h) and distilled molten diphenyl carbonate sent via a direct piping system (feed rate, 34.7 kg/h) were continuously fed to the below-described stirring tank for mixing raw materials, and polycarbonate with a target MFR of 11.0 g/10 min was manufactured.

The apparatus used for polymerizing polycarbonate was equipped with one 35 stirring tank for mixing raw materials, two prepolymerization tanks, and two horizontal polymerization tanks, and reaction materials were fed at a rate of 36.0 kg/h of bisphenol A successively to prepolymerization tank I, prepolymerization tank II, horizontal polymerization tank I, and horizontal polymerization tank II. Polymerization was conducted under the following conditions.

| Reactor | Pressure | Temperature (° C.) | Average retention time (hrs) |
| --- | --- | --- | --- |
| Stirring tank | Nitrogen atmosphere | 160 | 2.0 |
| Prepolymerization tank I | 100 torr | 230 | 1.0 |
| Prepolymerization tank II | 20 torr | 240 | 0.5 |
| Lateral polymerization tank I | 3~5 torr | 270 | 0.5 |
| Lateral polymerization tank II | 0.1~1.0 torr | 275 | 0.5 |

The pressure in horizontal polymerization tanks I and II was adjusted on the basis of MFR measurements taken at 2-h intervals, and the operation was carried out to keep as close as possible to the target MFR.

Example 1

Manufacture of Bisphenol A

Bisphenol A in which the effective amount of catalyst was equivalent to $2 \times 10^{-7}$ moles of bisphenol A disodium salt per mole of bisphenol A was continuously manufactured by adding to the drum a phenol solution of 0.5 percent sodium hydroxide to the crude liquid with the adjusted concentration in step (3) hereinabove.

The amount of phenol solution of 0.5% sodium hydroxide added in step (c) [sic] hereinabove was controlled by continuously measuring the effective amount of catalyst in the bisphenol A flakes obtained in step (8) hereinabove in such a way that the bisphenol A showed catalytic activity equivalent to that of $2 \times 10^{-7}$ moles of bisphenol disodium salt per mole of BPA.

Manufacture of Polycarbonate

Polycarbonate was manufactured continuously for 14 days by the polycarbonate manufacturing method described hereinabove, using molten bisphenol A sent continuously from step (7) hereinabove by a direct piping system.

Bisphenol A and polycarbonate samples were collected every 2 h, and the purity and hue of the bisphenol A and the color and MFR of the polycarbonate were evaluated. The results are shown in Table 1.

Example 2

Polycarbonate was manufactured in the same manner as in Example 1 by continuously manufacturing bisphenol A, except that the location for adding the phenol solution of 0.5 percent sodium hydroxide in Example 1 was changed to the slurry containing the addition product crystal obtained in step (4) (the slurry running through the pipe). The results are shown in Table 1.

Example 3

Polycarbonate was manufactured in the same manner as in Example 1 by continuously manufacturing bisphenol A, except that the location for adding the phenol solution of 0.5 percent sodium hydroxide in Example 1 was changed to the pipe carrying out the addition product crystal obtained by centrifugation and vacuum filtration in step (5). The results are shown in Table 1.

Example 4

Polycarbonate was manufactured in the same manner as in Example 1 by continuously manufacturing bisphenol A, except that the location for adding the phenol solution of 0.5 percent sodium hydroxide in Example 1 was changed to the tank for dissolving the addition product crystal in step (6). The results are shown in Table 1.

Example 5

Polycarbonate was manufactured in the same manner as in Example 1 by continuously manufacturing bisphenol A, except that the location for adding the phenol solution of 0.5 percent sodium hydroxide in Example 1 was changed to the pipe for carrying out the molten bisphenol A obtained in step (7). The results are shown in Table 1.

Example 6

Polycarbonate was manufactured in the same manner as in Example 5 by continuously manufacturing bisphenol A, except that bisphenol A disodium salt was used instead of the 0.5 percent phenol solution of sodium hydroxide in Example 5 and the bisphenol A disodium salt concentration was controlled to $8 \times 10^{-7}$ moles per mole of BPA. The results are shown in Table 1.

Comparative Example 1

Bisphenol A was manufactured without measuring the effective amount of catalyst in the bisphenol A or controlling the addition of alkali (alkaline earth) metal compound.

Polycarbonate was manufactured continuously for 14 days by the above-described method for polymerizing polycarbonate, adding bisphenol A disodium salt at a fixed proportion of $2 \times 10^{-7}$ mole per mole of bisphenol A to molten bisphenol A fed continuously to the stirring tank by the direct pipe from step (7). The results are shown in Table 1.

Comparative Example 2

Polycarbonate was manufactured in the same manner as in Comparative Example 1, except that bisphenol A disodium salt was added at a proportion of $4 \times 10^{-7}$ mole per mole of bisphenol A. The results are shown in Table 1.

Comparative Example 3

Bisphenol A and polycarbonate were manufactured in the same manner as in Example 5, except that the bisphenol disodium salt concentration was controlled to $2 \times 10^{-6}$ mole per mole of BPA. The results are shown in Table 1.

When the effective amount of catalyst is large as in Comparative Example 3, the bisphenol A and polycarbonate have poor hue (YI).

TABLE 1

| | Bisphenol A | | | | Polycarbonate | |
|---|---|---|---|---|---|---|
| | Effective Amount of Catalyst | | | | Color* | |
| | Equivalent to Moles of BPA.2Na/Moles of BPA | Variation | Color* APHA | Purity* (%) | (Yellowness Index, YI) | MFR* (g/10 min) |
| Example 1 | $2 \times 10^{-7}$ mol | ± 10% | 20 ± 5 | 99.92 ± 0.04 | 0.90 ± 0.02 | 11.0 ± 0.4 |
| Example 2 | $2 \times 10^{-7}$ mol | ± 10% | 20 ± 5 | 99.92 ± 0.03 | 0.91 ± 0.02 | 11.0 ± 0.4 |
| Example 3 | $2 \times 10^{-7}$ mol | ± 10% | 20 ± 5 | 99.93 ± 0.04 | 0.91 ± 0.02 | 11.0 ± 0.4 |
| Example 4 | $2 \times 10^{-7}$ mol | ± 10% | 20 ± 5 | 99.92 ± 0.05 | 0.90 ± 0.02 | 11.0 ± 0.4 |
| Example 5 | $2 \times 10^{-7}$ mol | ± 10% | 20 ± 5 | 99.93 ± 0.05 | 0.90 ± 0.02 | 11.0 ± 0.4 |
| Example 6 | $8 \times 10^{-7}$ mol | ± 2.5% | 20 ± 5 | 99.90 ± 0.03 | 0.92 ± 0.02 | 11.0 ± 0.4 |
| Comparative Example 1 | $2 \times 10^{-7}$ mol | ± 100% | 25 ± 10 | 99.88 ± 0.07 | 0.90 ± 0.08 | 11.8 ± 11.3 |
| Comparative Example 2 | $4 \times 10^{-7}$ mol | ± 50% | 25 ± 10 | 99.88 ± 0.07 | 0.90 ± 0.06 | 11.5 ± 1.1 |
| Comparative Example 3 | $2 \times 10^{-8}$ mol | ± 1% | 35 ± 5 | 99.78 ± 0.11 | 1.22 ± 0.04 | 11.0 ± 0.4 |

*Mean and standard deviation for data collected every 2 h for 14 days.

We claim:

1. A method of making polycarbonate comprising
melt polycondensing a carbonic acid diester and a bisphenol containing an alkali metal compound or alkaline earth metal compound and determining the transesterification activity of the bisphenol containing an alkali metal compound or an alkaline earth metal compound;
comparing the transesterification activity of the bisphenol containing an alkali metal compound or an alkaline earth metal compound to a calibration curve relating the transesterification activity of pure bisphenol to the amount of bisphenol A disodium salt per mole of pure bisphenol in a melt polycondensation reaction; and
adjusting the amount of alkali metal compound or alkali earth metal compound in the bisphenol containing an alkali metal compound or alkaline earth metal compound to attain transesterification activity equivalent to the transesterification activity of pure bisphenol containing about $1 \times 10^{-8}$ to $1 \times 10^{-6}$ moles bisphenol A disodium salt.

2. The method of making polycarbonate of claim 1, wherein the bisphenol containing an alkali metal compound or alkaline earth metal compound is prepared by forming an addition product of raw bisphenol and phenol, removing the phenol to form refined bisphenol and adding the alkali metal compound or alkaline earth metal compound to the refined bisphenol prior to polycondensation.

3. The method of making polycarbonate of claim 1, wherein the transesterification activity of the bisphenol containing an alkali metal compound or an alkaline earth metal compound is measured by an on-line analytical device.

4. The method of claim 1 wherein the bisphenol containing an alkali metal compound or an alkaline earth metal compound comprises bisphenol A.

5. A method of making polycarbonate comprising
melt polycondensing a carbonic acid diester and a bisphenol containing an alkali metal compound or alkaline earth metal compound; and
controlling the amount of alkali metal compound or alkaline earth metal compound in the bisphenol so as to attain catalytic activity that is within about 10% of the catalytic activity of about $1 \times 10^{-8}$ to about $1 \times 10^{-6}$ mole of bisphenol A disodium salt per mole of pure bisphenol A.

* * * * *